United States Patent
Dutt et al.

(10) Patent No.: US 7,134,008 B2
(45) Date of Patent: Nov. 7, 2006

(54) UTILITY FOR CONFIGURING AND VERIFYING DATA SOURCES

(75) Inventors: Bala Dutt, Bangalore (IN); Ajay Kumar, Bangalore (IN); Venugopal Rao K., Karnataka (IN); Sankara R. Bhogi, Bangalore (IN); Srinivasan Kannan, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 485 days.

(21) Appl. No.: 10/655,247

(22) Filed: Sep. 4, 2003

(65) Prior Publication Data

US 2005/0066155 A1 Mar. 24, 2005

(51) Int. Cl.
*G06F 15/177* (2006.01)
(52) U.S. Cl. .............................. 713/1; 713/100; 700/17
(58) Field of Classification Search .................... 713/1, 713/100; 707/1; 700/17
See application file for complete search history.

(56) References Cited

U.S. PATENT DOCUMENTS

| | | | |
|---|---|---|---|
| 5,504,899 A | 4/1996 | Raz | |
| 5,504,900 A | 4/1996 | Raz | |
| 5,630,081 A | 5/1997 | Rybicki et al. | |
| 5,701,480 A | 12/1997 | Raz | |
| 6,038,587 A | 3/2000 | Phillips et al. | |
| 6,243,737 B1 | 6/2001 | Flanagan et al. | |
| 6,421,688 B1 | 7/2002 | Song | |
| 6,442,618 B1 | 8/2002 | Phillips et al. | |
| 6,496,828 B1* | 12/2002 | Cochrane et al. | 707/10 |
| 6,519,679 B1* | 2/2003 | Devireddy et al. | 711/114 |
| 6,704,737 B1* | 3/2004 | Nixon et al. | 707/101 |
| 6,832,238 B1 | 12/2004 | Sharma et al. | |
| 6,854,646 B1 | 2/2005 | Ieshima et al. | |
| 6,862,573 B1 | 3/2005 | Kendall et al. | |
| 6,873,995 B1 | 3/2005 | Benson | |
| 6,981,221 B1* | 12/2005 | Neudeck | 715/735 |
| 2002/0124083 A1 | 9/2002 | Jeyaraman et al. | |
| 2003/0033398 A1* | 2/2003 | Carlson et al. | 709/223 |
| 2005/0088413 A1 | 5/2004 | Bhogi et al. | |
| 2004/0153349 A1 | 8/2004 | K. et al. | |
| 2004/0153383 A1 | 8/2004 | K. et al. | |
| 2004/0153450 A1 | 8/2004 | K. et al. | |

(Continued)

OTHER PUBLICATIONS

Liu et al., "Designing a Test Suite for Empirically-based Middleware Performance Prediction," Australian Computer Society, Inc., (2002), (8 Pages).

(Continued)

*Primary Examiner*—Thomas Lee
*Assistant Examiner*—Hari Patel
(74) *Attorney, Agent, or Firm*—Robert C. Kowert; Meyertons, Hood, Kivlin, Kowert & Goetzel, P.C.

(57) ABSTRACT

Various embodiments of a utility for configuring data sources in a networked computer system are disclosed. A networked computer system may include a number of back-end systems hosting a variety of types of data resources including databases produced by a variety of vendors. Application servers running transactional applications as well as many other types of computer systems may be included in the networked system. The data source configuration utility may determine the data source configuration parameters associated with each of the various types of data resources included in the system. When a data source is selected for configuration, the utility may present the configuration parameters corresponding to that particular data source to the user. The utility may create one or more data source configuration files based on parameter values received from the user.

30 Claims, 12 Drawing Sheets

U.S. PATENT DOCUMENTS

| | | |
|---|---|---|
| 2004/0215894 A1 | 8/2004 | Bhogi et al. |
| 2004/0215473 A1 | 10/2004 | Bhogi et al. |
| 2004/0216109 A1 | 10/2004 | Bhogi et al. |
| 2005/0015353 A1 | 1/2005 | Kumar et al. |
| 2005/0015425 A1 | 1/2005 | Kumar et al. |
| 2005/0055324 A1 | 3/2005 | Dutt et al. |

OTHER PUBLICATIONS

"Java™ 2SDK, Enterprise Edition 1.3.1 Configuration Guide," http://java.sun.som/j2ee/sdk_ 1.3/techdocs/release/ConfigGuide.html, Jan. 3, 2002, (16 pages).

Ellis et al., :JDBC™ 3.0 Specification—Final Release, Sun Microsystems, Inc., Oct. 2001, (190 pages).

"iPlanet Application Server 6.0 Administration Guide: Chapter 4 Logging Server Messages," http://docs.sun.com/source/816-5720-10/adlog.htm, Sep. 5, 2000, (21 Pages).

"JDBC™ Data Access API—The JDBC API Universal Data Acess for the Enterprise," java.sun.com, Aug. 10, 2003, (5 Pages).

"Connection Pooling," Advanced Programming for the Java 2 Platform, Aug. 16, 2002, (4 Pages).

Siva Visveswaram, "Manage Acess to Shared, Server-Side Resources for High Performance—Dive Into Connection Pooling with J2EE," JavaWorld, Oct. 2000, (8 Pages).

"Interface DataSource," DataSource (Java 2 Platform, SE v1.4.1), 2002, (1 Page).

"Initial Context," JNDI 1.2.1 Specification: Class Initial Context, http://java.sun.com/products/jndi/1.2/javadoc/javax/naming/InitialContext.html, Jul. 14, 1999, (1 page).

JNDI—Java™ Naming & Directory Interface™, Sun Microsystems, Inc., http://java.sun.com/jndi, May 15, 2003, (2 Pages).

"iPlanet Application Server 6.0 Administration Guide: Chapter 9 Administering Transactions," http://docs.sun.com/source/816-5784-10/adtrans.htm, Sep. 5, 2000, (11 Pages).

Breitbart et al., "Replication and Consistency Being Lazy Helps Sometimes," PODS '97, Jun. 1997, (pp. 173-184).

Patricia Serrano-Alvarado et al."Mobile Transaction Supports for DBMS". In 17ièmes Journées Bases de Données Avancées, Agadir, Maroc, Oct. 2001 (19 Pages).

Efficient and Flexible Methods for Transient Versioning of Records to Avoid Locking by Read-Only Transactions, 1992 ACM SIGMOD, Jun. 1992, (pp. 124-133).

BEA WebLogic Enterprise 5.1, BEA Systems, Inc., 2000, (13 Pages).

"Simplified Guide to the Java TM 2 Platform Enterprise Edition," Sun Microsystems, Inc., 1999, (13 Pages).

Dogac et al., "METU Interoperable Database System," Demo Description, In Proc. Of ACM Sigmod Intl. Conf. On Management of Data, Jun. 1996, (6 Pages).

Oracle9i JDBC Developer's Guide and Reference (Mar. 2002, retrieved from http://www.stanford.edu/dept/itss/docs/oracle/9i/java.920/a96654/toc.htm on Sep. 6, 2005).

Kannegaard (J2EE BluePrints, Mar. 20, 2000 retrieved from http://java.sun.com/blueprints/guidelines/designing_enterprise_applications/apmTOC.html on Sep. 6, 2005).

* cited by examiner

UTILITY FOR CONFIGURING AND VERIFYING DATA SOURCES

BACKGROUND OF THE INVENTION

1. Field of the Invention

The invention relates to computer systems and computer software, and more particularly to configuring and verifying data sources in computer systems 2. Description of the Related Art Enterprise computer systems may include many repositories for information that are accessed by one or more computers to which they are networked. One type of data resource may be relational databases as supplied by vendors such as Oracle, MicroSoft, IBM, Sybase, and others. Many other types of data resources may be included in a networked computer system such as object databases, XML files, Excel files, and web services. In order to access the information stored in a particular type of data resource, an application server within the networked system is typically configured with a driver that includes specific information about how to communicate with that particular data source.

Installation of a data resource driver may involve the entry of system/driver specific information to link various application extensions, utilities, and libraries. In addition to driver installation, a data source corresponding to the data resource may need to be configured on the application server. Procedures and specific information required for driver installation and data source configuration may be highly vendor specific, and in some cases even data resource specific. Each vendor may require the entry of values for a different set of data resource parameters, and may instruct the user in different methods for determining the appropriate values for their system.

Database vendors typically specify a set of configuration parameters that is unique to their own databases. Configuring a data source corresponding to a database often includes searching through a vendor's documentation to discover information regarding appropriate values for configuration parameters, followed by editing various configuration files to incorporate the parameter values. These procedures often result in a proprietary configuration that is specific to a vendor's database product. In some instances a vendor may include some type of utility to assist the user in configuring a specific database product, but again product specific and/or proprietary configurations are typically produced.

The process described above is typically repeated for each different vendor's databases, which are included in a networked computer system. In a system including database products from several vendors, the resultant configuration files may reflect the differences in the various vendors' approaches to specification of configuration parameters. This may add complexity to configuring an application server to make use of the configuration parameters for the different data sources. Once configuration has been accomplished, verification of the configuration normally includes deploying an application and attempting to execute transactions. When problems with the transactions arise, the solution frequently involves iterative adjustment of database configuration parameters and retesting. In large systems, each iteration of application deployment may have a significant impact on system and/or function availability.

SUMMARY

Various embodiments of a utility for configuring data sources in a networked computer system are disclosed. A networked computer system may include a number of backend systems hosting a variety of types of data resources including databases produced by a variety of vendors. Application servers running transactional applications as well as many other types of computer systems may be included in the networked system. The data source configuration utility may determine the data source configuration parameters associated with each of the various types of data resources included in the system. When a data source is selected for configuration, the utility may present the configuration parameters corresponding to that particular data source to the user. The utility may create one or more data source configuration files based on parameter values received from the user.

When a backend system including a database is added to a networked computer system, computers running applications that require access to the new database may need to configure or reconfigure one or more data sources. The configuration of a data source may include assigning values to data source configuration parameters included in data source properties. A data source configuration utility may interact with a user through a graphic user interface to obtain values for some or all of the data source configuration parameters for a particular database. The data source configuration utility may include information on a variety of databases produced by various database vendors. For example, the utility may include sets of data source configuration parameters associated with the most popular or the most widely deployed types of databases.

The data source configuration tool may query the user for the type of database for which the data source will be supplying connections. The type of the database may include a vendor designation and product line designation among other parameters. Once the data source configuration utility has received input as to what type database driver is associated with the data source, it may suggest a subset of the data source configuration parameters to be used as an identity for the data source. The utility may be able to verify the uniqueness of a data source identity selected by the user by comparing it to the identities of all other data resources in the networked computer system.

When the user has supplied all necessary information to configure a data source, the utility may attempt to establish a connection between the computer on which the utility is running and the backend system running the database. If the data source has been correctly configured, the two computers should be able to successfully communicate using the connection. If successful communication cannot be established, the utility may suggest that the user alter some of the configuration parameter values for another attempt.

In some instances the data source to be configured may correspond to a data resource to be incorporated into a large networked computer system supporting transactions. Verification of both identity uniqueness and connection functionality may be performed by the data source configuration utility without the need to deploy a transactional application. The deployment and verification of a transactional application may require that the entire networked computer system or portions thereof be taken "offline" (rendered unavailable) for a period of time. For large E-commerce systems, having transactional application servers unavailable may be costly in terms of missed business opportunities. Therefore, it may be advantageous to verify data source configuration without the need for transactional application deployment.

BRIEF DESCRIPTION OF THE DRAWINGS

A better understanding of the present invention can be obtained when the following detailed description is considered in conjunction with the following drawings, in which.

Figure 1:
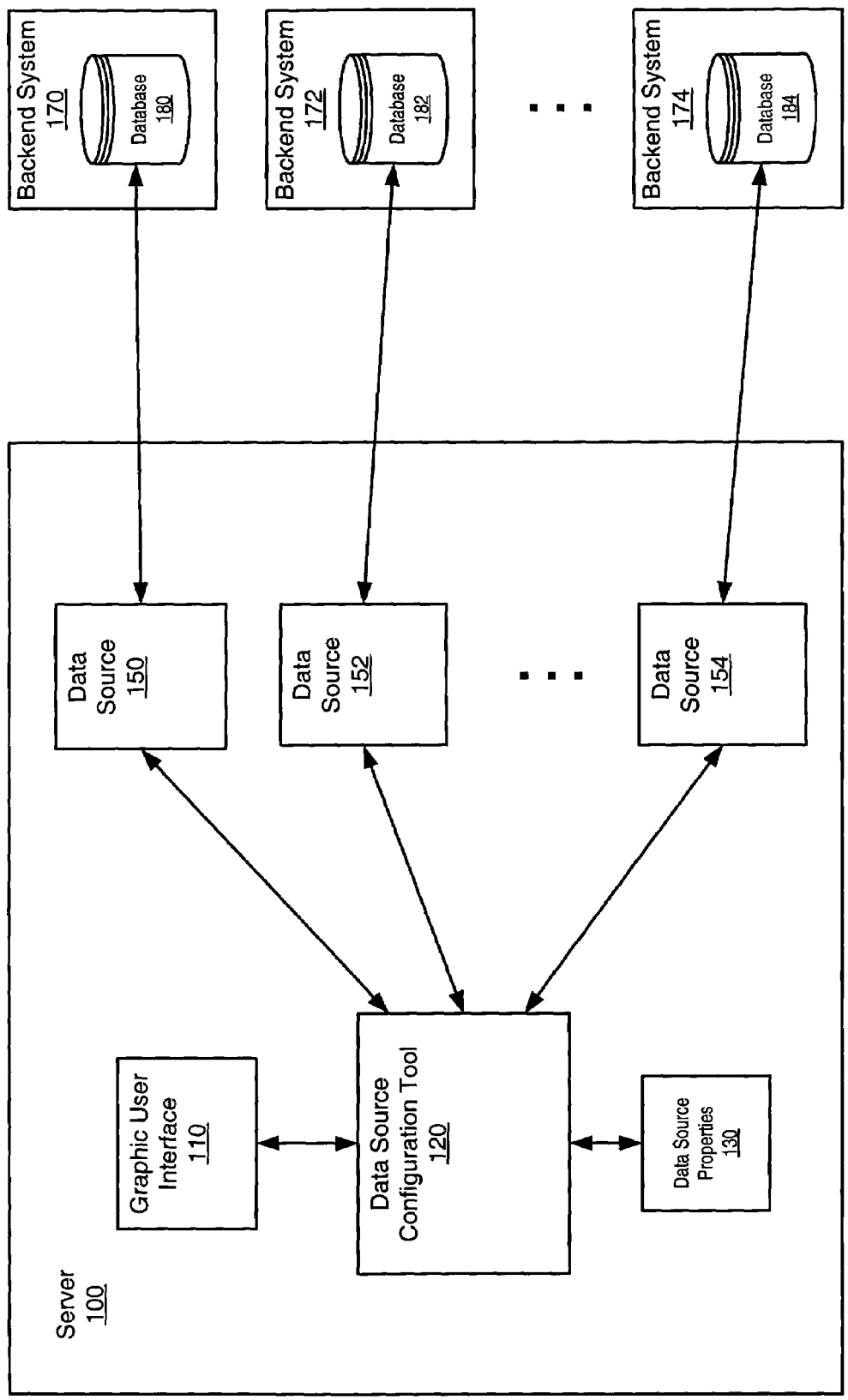
FIG. 1 depicts a networked computer system including a utility for configuring data sources, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Any computer within a networked computer system that requires communications with one or more data resources may employ one or more data source objects to provide the necessary connections. The computer may also include a utility for configuring data sources corresponding to different data resources provided by different vendors. This data source configuration utility may present a consistent, graphic user interface to the user and facilitate the configuration of various data sources by systematically presenting the user with selections of appropriate values from which to select, when entering data resource parameters. This may be particularly important for the utility may be used to configure data sources in the case of large networked computer systems that include a plurality of computers coupled to a large number of backend systems including a plurality of data resources that are products of a wide variety of vendors.

FIG. 1 illustrates a server 100 that may include a utility 120 for configuring data sources 150, 152, and 154, according to one embodiment. Backend systems 170, 172, and 174 may include multiple databases 180, 182, and 184 along with other data resources, which along with server 100 may be components of a networked computer system. The databases may be the products of various database vendors or, different types of products from the same vendor, each with different protocols, interfaces, query languages, etc. and multiple data resources may be resident in the same backend system. An application may access a database 180 by means of a connection obtained from data source 150. Data source 150 may be configured with a subset of data source properties 130 specific to database 180 or in some cases, specific to multiple databases from a specific vendor.

When a backend system including a data resource is added to a networked computer system, computers running applications that require access to the new database may need to configure or reconfigure one or more data sources in order to access the backend data resource. The configuration of a data source may include or access assigning values to data source configuration parameters included in data source properties. A data source configuration utility 120 may interact with a user through a graphic user interface 110 to obtain values for some or all of the data source configuration parameters for a particular database. The data source configuration utility 110 may include information on a variety of databases produced by various database vendors. For example, the utility may include sets of data source configuration parameters associated with the most popular or the most widely deployed types of databases. In other embodiments, the utility may query or inspect a data resource to discover parameters associated with the data resource.

When the user has specified the data source to be configured, the data source configuration tool 120 may determine the type of the database associated with the data source. The type of the data resource may include a vendor designation and product line designation and may determine the appropriate driver to be used in communicating with the resource. In one embodiment, the data source configuration utility 120 may store sets of configuration parameters along with the types of data resources to which they correspond. Once the database type is input, the utility may then look up the corresponding set of data source configuration parameters for presentation to the user. In another embodiment, the data source configuration utility 120 may dynamically determine the data source configuration parameters required for given type of data resource. For example, the utility may query a network directory service to determine the locations of various data resources on a network and then communicate with each type of data resource directly in order to ascertain its specific data source configuration parameter requirements.

The data source configuration utility 120 may present the user with a set of configuration parameters appropriate for the selected data source along with typical or suggested values for each of the parameters. The data source configuration utility 120 may present the parameters and values to the user via a common user interface in which parameters used for the same purpose by different types of data resources are presented to the user in the same way and/or with the same wording for each type of data source being configured. In some embodiments the common user interface may be graphical user interface and security related parameters may consistently be presented to the user on the same screen or in the same portion of a screen and/or in the same order in the configuration sequence regardless of which type of data source is undergoing configuration. In one embodiment, presenting properties to the user may involve Java to XML conversion. The consistency of location and order inherent in the common user interface may increase the efficiency of users configuring many data sources of different types.

In addition to configuration parameters, the may allow the specification of other information to be used by the application server for other purposes. One example of this may be the specification of an identity for the data source. When the user has supplied necessary values for configuration parameters, the utility may suggest a subset of the data source configuration parameters to be used as an identity for the data source. The identity of the data source may uniquely determine the backend data resource for which the data source will supply connections. The utility may be able to verify the uniqueness of a data source identity selected by the user by comparing it to the identities of all other data resources in the networked computer system.

In some embodiments, a data source may be an object such as a Java Bean with settable parameters. In configuring the data source, the utility may set the properties of the bean based on the received user input. This may involve an XML to Java conversion. When the user has entered all the information required to configure a data source, the utility may attempt to verify the configuration of the data source. In one embodiment, the utility may try to verify the configuration by attempting to establish a connection between the computer on which the utility is running and the backend system running the database. If the data source has been correctly configured, the two components should be able to successfully communicate using the connection. If successful communication cannot be established, the utility may suggest that the user alter some of the configuration parameter values for another attempt.

In some instances the data source to be configured may correspond to a data resource to be incorporated into a large networked computer system supporting transactions. Verification of both identity uniqueness and connection functionality may be performed by the data source configuration utility without the need to deploy a transactional application. The deployment and verification of an application may require that the entire networked computer system or portions thereof be taken "offline" (rendered unavailable) for a period of time. For large E-commerce systems, having transactional application servers unavailable may be costly in terms of missed business opportunities. Therefore, it may be advantageous to verify data source configuration without the need for transactional application deployment.

Figure 2:
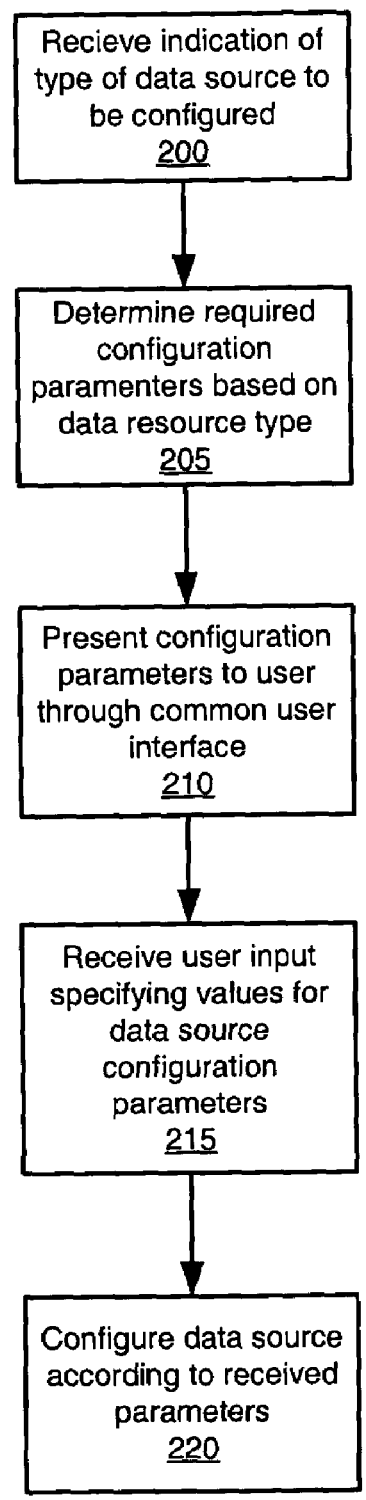
FIG. 2 is a flowchart of a method for operating a utility for configuring data sources, according to one embodiment.

FIG. 2 is a flowchart of a method for operating a data source configuration utility, according to one embodiment. At 200, an indication of the type of the data source to be configured may be received. For example, the user may select the data source type from a list or menu presented through a Graphic User Interface (GUI). As illustrated in block 205, the set of parameters required to configure the data source may be determined by the type of the data source. For example, all data sources provided by one vendor may require a specific set of data source configuration parameters, so in this case knowing the vendor designation may be sufficient to determine the data resource type. In another instance, a single vendor may supply several different models of data resource products with differing sets of configuration parameters. In this case, it may be necessary to know both the vendor and the specific product designation in order to fully specify the data source type.

In any case, the user may be presented with the set of data source configuration parameters that corresponds to the specified data resource type through a common user interface, as shown in block 210. In some embodiments, the user may also be presented with typical or suggested values for one or more of the data source configuration parameters. User input specifying values for the data source configuration parameters may be received at block 215 and data source configuration files may be produced and/or updated, as shown in block 220. In embodiments in which the data source is a Java Bean, this may involve an XML to Java conversion.

Figure 2A:
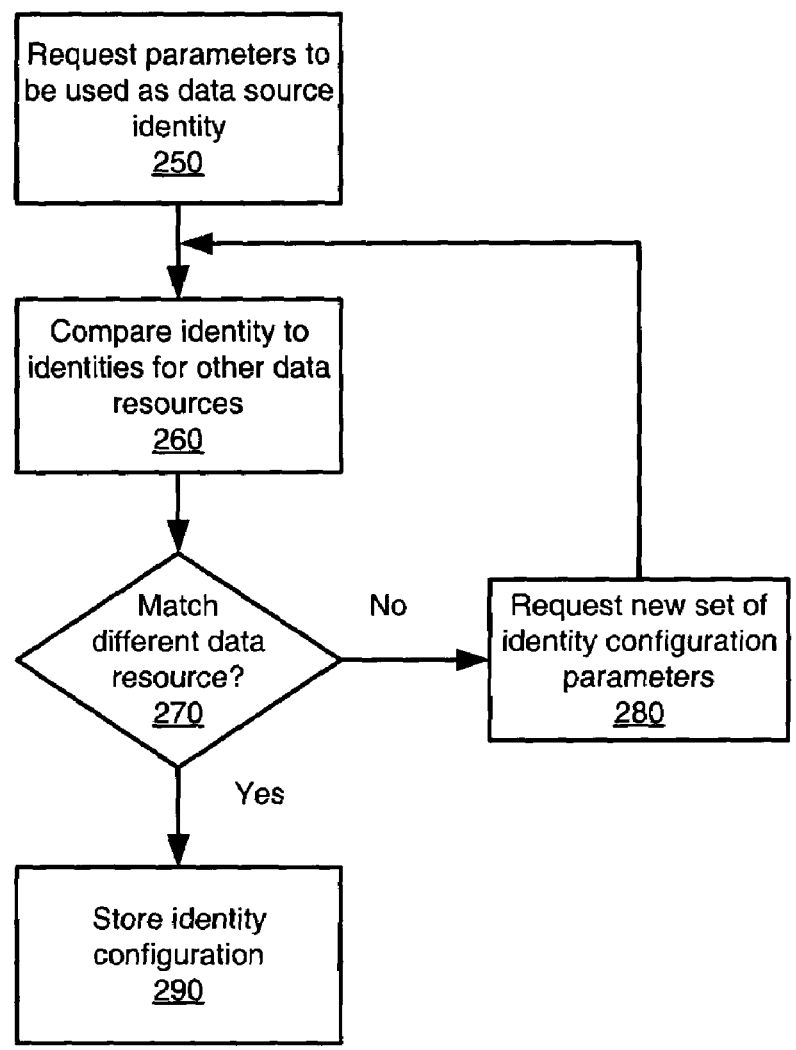
FIG. 2a is a flowchart of a method for selecting parameters for a data source identity, according to one embodiment.

In some embodiments, the user may be asked, via the common user interface, to specify certain other information to be used by the application server. One example of this may be the designation of a data source identity. FIG. 2a is a flowchart of a method for selecting parameters for a data source identity, according to one embodiment. At 250, the use may be asked to select a subset of the data source configuration parameters to be used as the identity for the data source being configured. When the user input for the identity is received, the identity may be compared with the identities of other data resources, as illustrated in block 260. At decision block 270, if the proposed identity for the data source matches the identity of any other data resource in the network, the user may be requested to select a different subset of the data source configuration parameters to use for the data source identity, as indicated by block 280. This sequence may be repeated until a unique identity has been established, as shown at block 290. In other embodiments, the user may not be asked to select data source identity parameters until all data sources have been configured, or a default set of parameters may be used with no input from the user.

Figure 3:
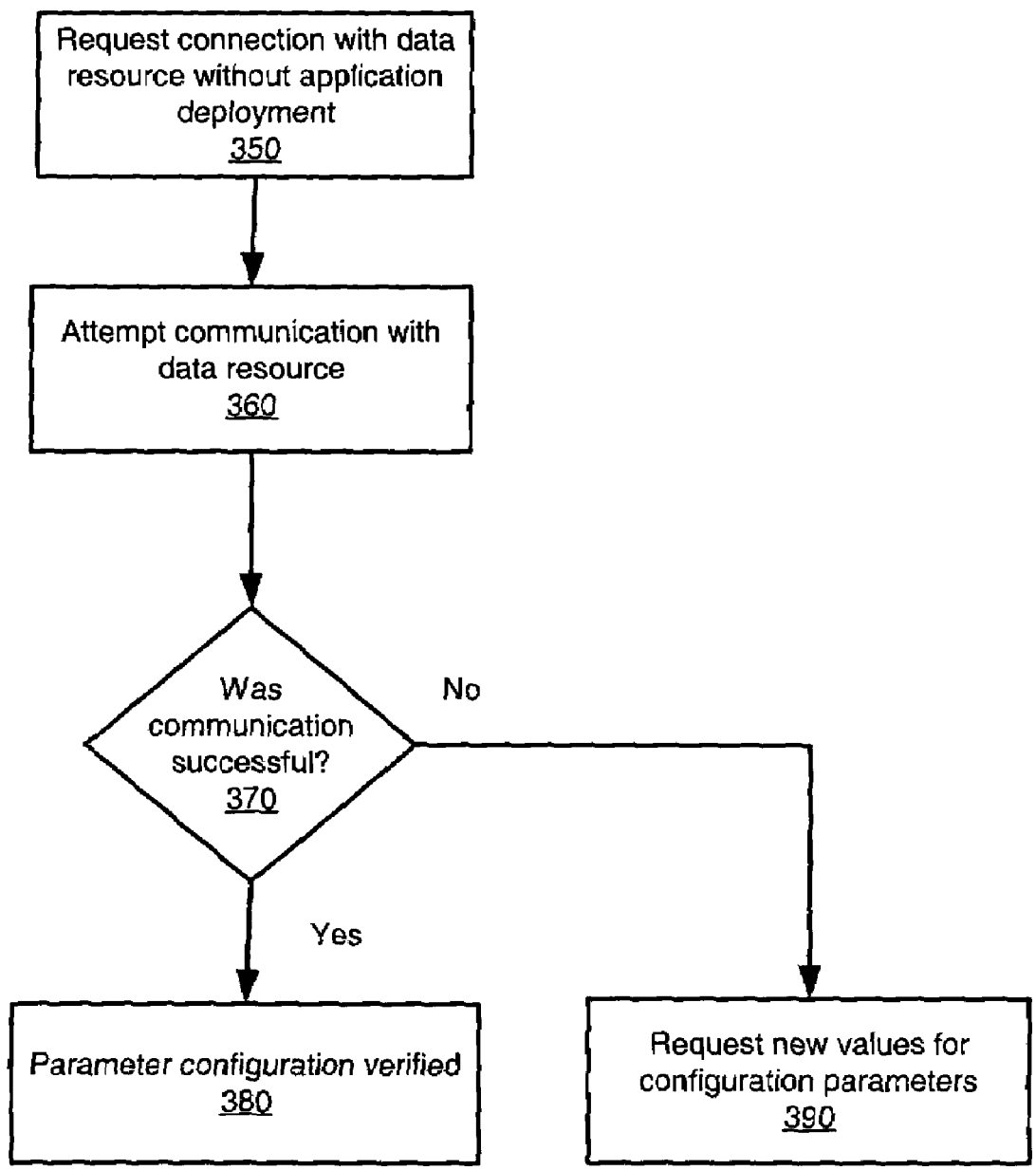
FIG. 3 is a flowchart of a method for verifying the configuration of data sources, according to one embodiment.

FIG. 3 is a flowchart of a method for verifying the configuration parameters of a data source without deploying an application, according to one embodiment. At 350, once the configuration parameters associated with a data source have been specified, a connection may be obtained from the data source and an attempt made to use the connection to communicate with the corresponding data resource, as illustrated in block 360. For example, "user name" and "password" values may be used to attempt to establish a connection to a database whose access is protected. If messages can be exchanged successfully between the server and data resource, as determined at decision block 370, the configuration of the data source may be considered to be verified, as indicated at block 380. If problems arise during the communications attempt, the user may be requested to re-enter different values for one or more of the configuration parameters, as illustrated at block 390. Therefore, the configuration of a data source may be an iterative process including multiple verification procedures.

In typical systems that do not incorporate the disclosed invention, an application may need to be deployed in order to verify the functionality of a data source configuration. The application may be transactional, and the data source may be verified by including the corresponding data resource as a participant in transactions. Anomalous transaction behavior may be used to indicate an incorrect data source connection and several iterations of data source reconfiguration and application re-deployment may be required in some instances to achieve proper data source configuration. For large networked systems, each iteration of application deployment may be costly in terms of the amount of time in which system resources are unavailable.

In embodiments of the disclosed invention, the data source configuration utility may be used to verify both the identity and functionality of newly configured/reconfigured data sources without the need for the deployment of an application. The significance of data source identities is treated more thoroughly below.

Figure 4:
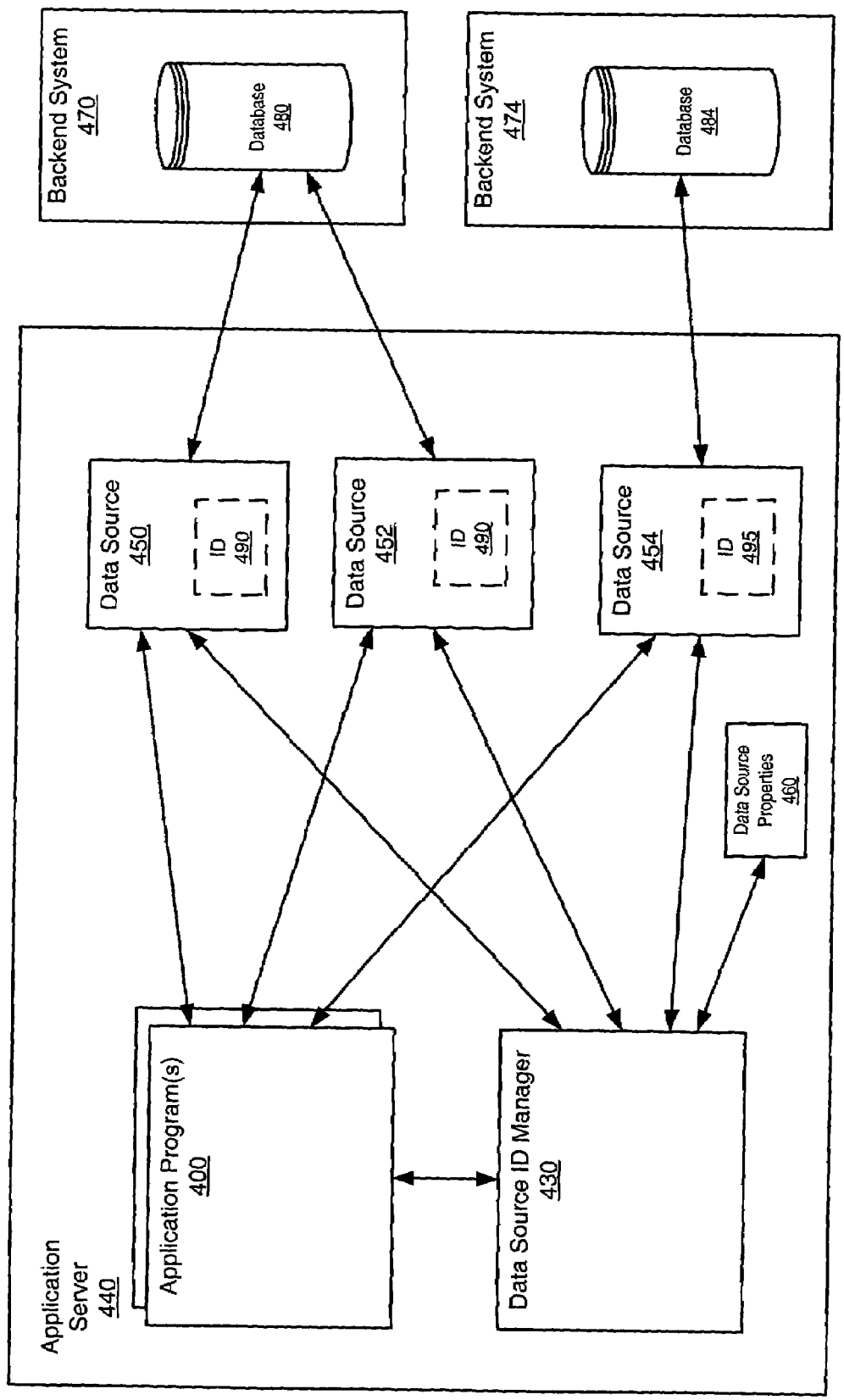
FIG. 4 illustrates components of an application server, according to one embodiment.

FIG. 4 is a block diagram illustrating components of application server 440, according to one embodiment. Application server 440 may include application program(s) 400, data source ID manager 430, data source objects 450, 452, and 454, and data source properties 460, among other components. Typically, an application server 440 may include a data source for each abstract name for a data resource with which application programs 400 requires communication. Some data sources may provide only local connections. Such data sources may be referred to as local data sources. A local connection, for example may be used in transactions involving only one data resource. For example, data source 450 may provide local connections to database 480 resident on backend system 470. Other data sources may provide global connections, or both global and local connections. Such data sources may be referred to as global data sources. Global connections may be used, for example, in transactions involving multiple distinct data resources. Data source 452 may be an XA data source supporting distributed transactions and providing global XA connections, which are also associated with database 480 resident on backend system 470.

In one embodiment, the data sources may be Java Data Base Connectivity (JDBC) DataSources and may be connection factories through which connection to different data resources (e.g. databases) can be retrieved. These DataSource objects may hide data base specific configuration and offer a uniform interface for getting new connections as defined in JDBC. A global data source may be an XADataSource similar to a DataSource except that it is used to retrieve XAConnections. As described below, a unique identity may be established across DataSource and XADataSource objects and may be used to determine if two data source entities refer to the same backend data resource in order to facilitate connection sharing. By determining data source identities, a connection once retrieved from a data source may be shared across multiple uses in an application or transaction.

The identity of both local and global data sources may be defined by a subset of properties used to configure the data source. For example, when a driver for a database is specified, a subset of properties may be linked as that data source's identity.

For data sources participating in a transaction, the identity of each requested data source may be compared to the identities of any data sources already participating in the transaction. If a match is found, the existing data source connection is used by the application. This may allow some transaction to be treated as local transactions (and thus use a more efficient commit protocol) that otherwise would have been treated as global transactions.

In some embodiments, a data source ID manager 430 may be included to determine data source identities. For example, an application 400 may request a connection with a data resource 480 according to an abstract name associated with the data resource. The application may specify a data source to provide the connection. Data source ID manager 430 may receive or intercept the application request and determine a unique data source ID for the specified data source. In one embodiment, data source ID manager 430 may determine the data source ID from a set of data source properties for the specified data source. In one embodiment, a configuration utility may have been used to configure the data sources and to indicate which data source properties 460 should be used to uniquely identify each data source. Data source ID manage 430 may determine which data sources have the same data source identity. For example, data sources 450 and 452 may both have data source identity 490 and therefore, may both be capable of supplying connections to the same data resource.

Data source ID manager 430 may determine whether any data source having a matching data source ID has previously supplied a connection of the requested type that is still available to the application, and if so, return or cause to be returned the previously supplied connection to the application. For example, for a request to access database 480, if a connection has previously been supplied from either data source 450 or 452, the data source ID manager may return this connection to the application. If no connection exists, data source ID manager 430 may cause the appropriate data source to obtain a new connection.

Figure 5:
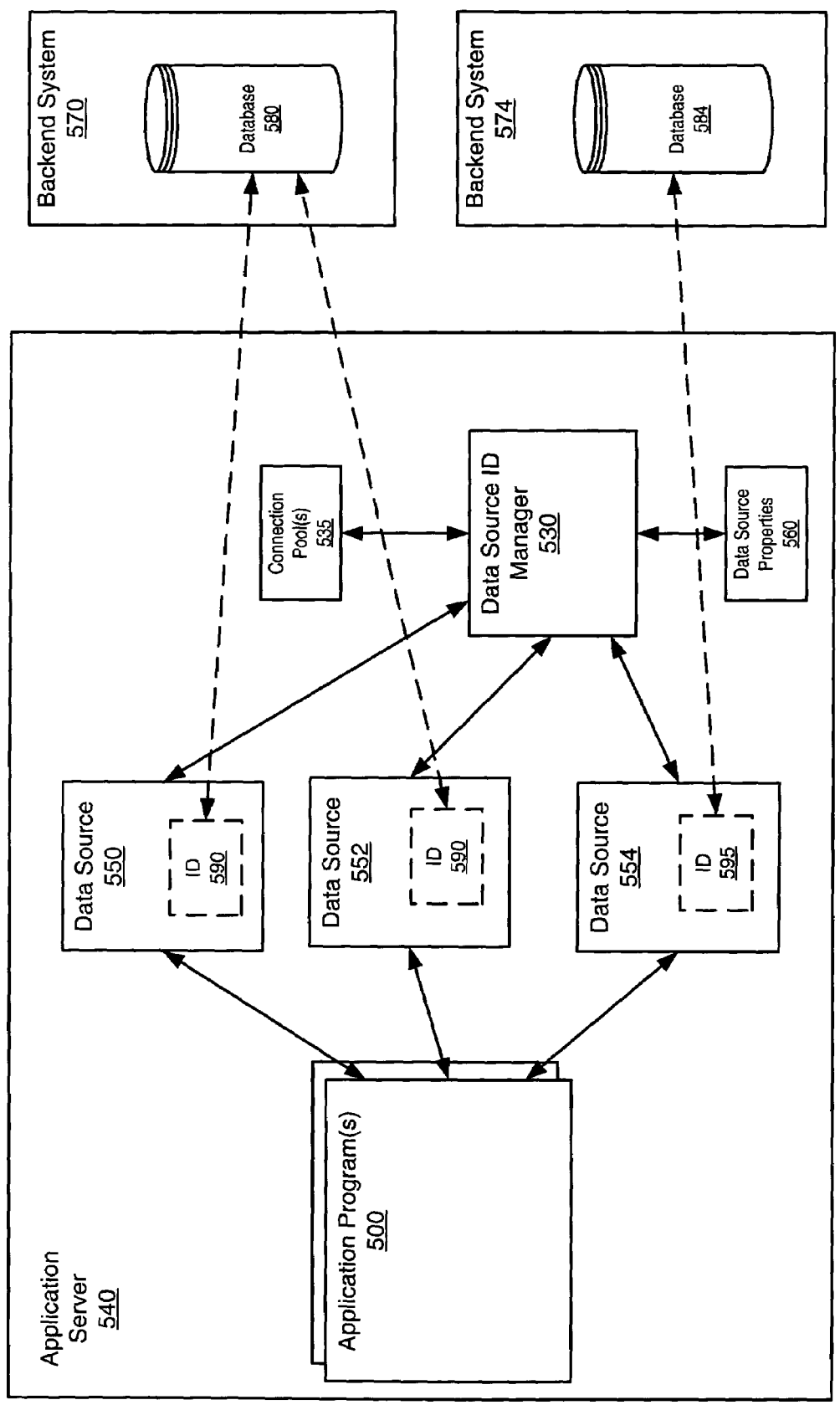
FIG. 5 illustrates components of an application server, according to another embodiment.

In other embodiments, as depicted in FIG. 5 the data source ID manager may intercept connection requests from data sources to a connection repository of the application server, e.g. connection pool 535. If an application 500 requests a connection with a data resource 580 according an abstract name associated with the data resource from data source 550, data source 550 may return a connection to the application in response to the request. To return the connection, data source 550 may request a connection to data resource 580 from connection pool 535. Data source ID manager 530 may receive or intercept the request and determine a unique ID for the data source. In one embodiment, data source ID manager 530 may use a particular set of data source properties to determine a data source identity 590 associated with the request and determine which other data sources have the same data source identity 590. For example, data source 552 may also have data source identity 590 and therefore, may be capable of supplying connections of the requested type.

Data source ID manager 530 may determine whether a data source with a matching ID, e.g. data source 552, has previously supplied a connection that is still active of the requested type to the application. If a connection has previously been supplied from data source 552, the data source ID manager may return or cause to be returned this connection to data source 550 to be sent to the application. If no connection has been supplied previously, data source ID manager 530 may forward the connection request to connection pool 535 for a new connection. By sharing previously supplied connections, across data sources with matching data source identities, the data source ID manager 130 may eliminate redundant connections.

In still other embodiments, upon receiving a request for a connection, data source ID manager may determine a unique data source identity associated with the request (e.g. from a predetermined set of properties for that data source), as described above. The data source ID manager may compare the data source identity associated with the request with the identities of available data sources to determine whether a data source exists that is capable of supplying connections of the requested type. If no such data source exists, the data source ID manager may instantiate a data source associated with the abstract name to supply the necessary connection. If a data source with a matching data source ID already exists, the data source ID manager may forward the request to that data source. In another embodiment, the data source ID manager may create data source proxies for each different data source specified by an application (e.g. according to each different abstract name for data resources used in the application. For each data source referenced by the application having matching data source IDs, the data source ID manager may configure the data source proxies as proxies to the same true data source. In this way, redundant connections may be eliminated through eliminating redundant data sources.

Figure 6:
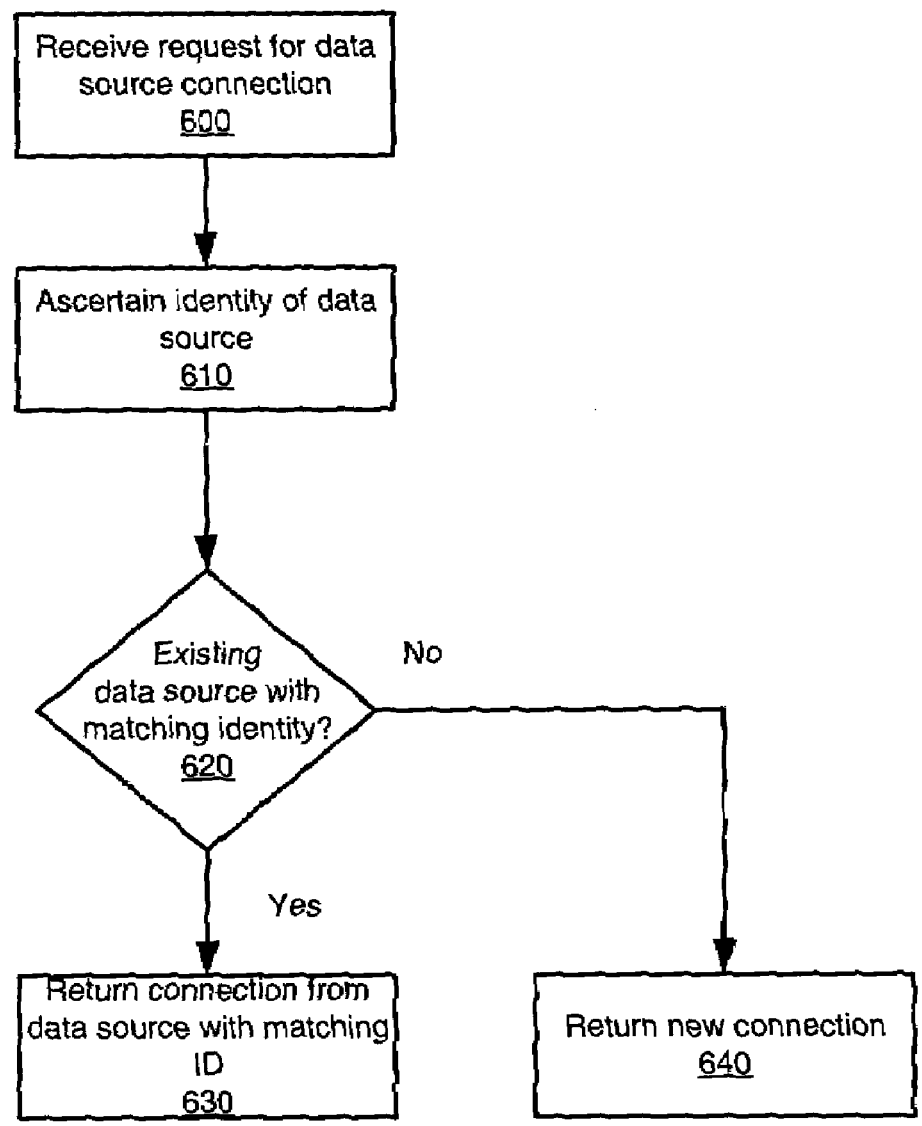
FIG. 6 is a flowchart of one embodiment of a method of operating an application server.

FIG. 6 is a flowchart of a method using data source IDs in an application server to improve efficiency of operation, according to one embodiment. At 600, an application may issue a request for a connection to a data resource. As depicted in block 610, a unique data source identity corresponding to the request may be ascertained. For example, data source property information may retrieved from a data source properties object. The data source ID may be based on the information or values for a predetermined set of the data source properties for the requested data source.

In decision block 620, the ascertained data source ID may be compared to data source IDs for other data sources in the application server. If a data source has already been established with a matching ID, a connection from the data source with a matching ID may be returned to the application, as shown in block 630. For example, the data source having a matching ID might have multiple connections pooled and the application server might choose any one of them to be returned. If no identity match is found at 620, a new connection may be obtained and returned to the application, as depicted at 640.

Figure 7:
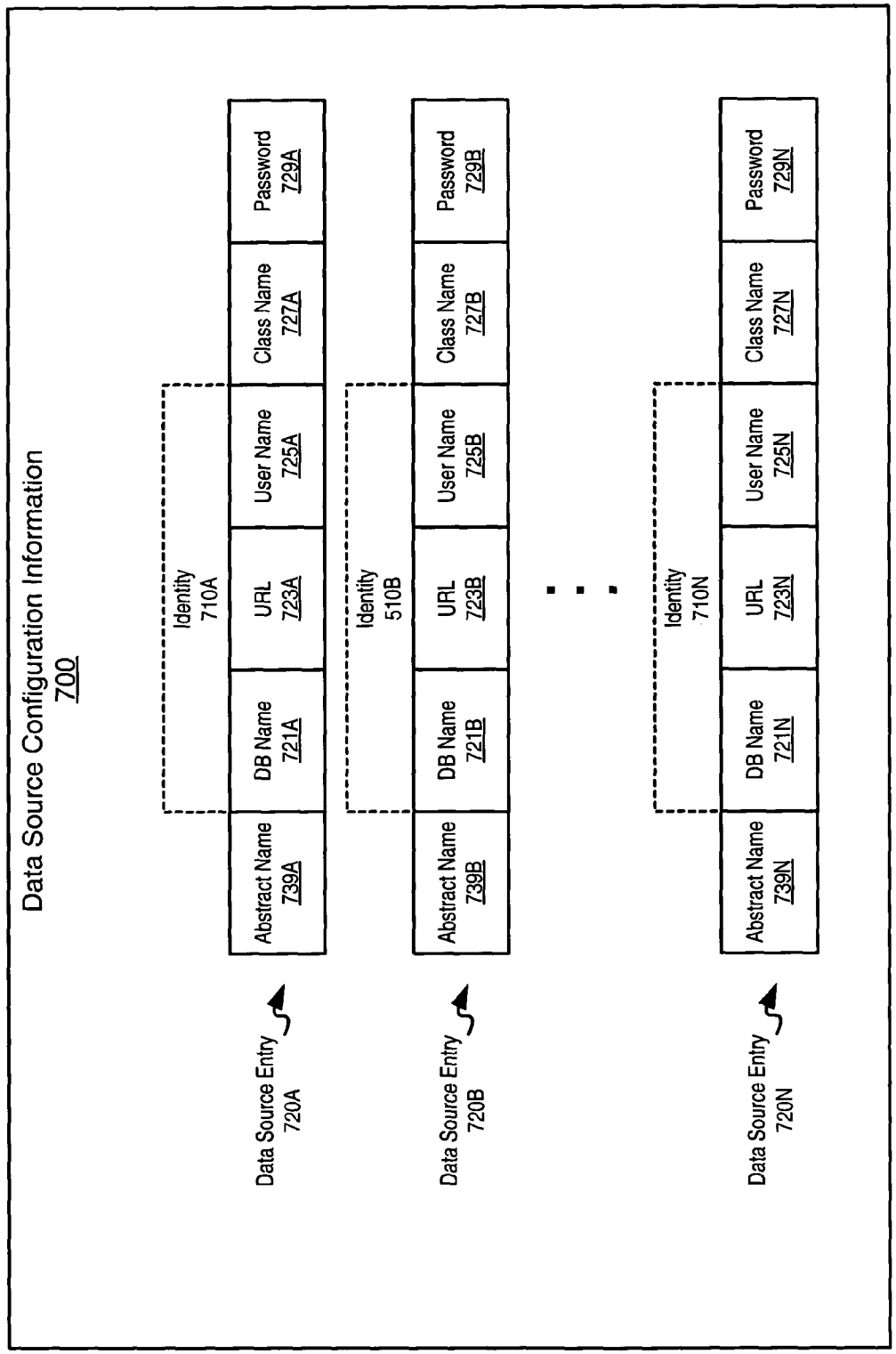
FIG. 7 illustrates a logical representation of data source configuration properties, according to one embodiment.

FIG. 7 illustrates a logical representation of data source configuration properties 700, according to one embodiment. In any given implementation, data source configuration information 700 may not necessarily be stored in the format illustrated. An application running on an application server may require communications with various data resources such as databases. Some of these data resources may reside on backend systems networked to the application server. The application server may include configuration information to establish successful communications with each of the data resources with which the application interacts.

Data source configuration information 700 may include a plurality of data source entries 720. A data source entry may include the information needed to connect an application to a database that is managed by a database driver. Data source objects may work with a naming directory interface service in such a way that a connection may be instantiated and managed independently of the applications that use it. In this manner, connection information, such as path and port number, may be quickly changed in the properties of the data source object, without requiring code changes in the applications that use the data resource.

In some embodiments, data source configuration information 700 may be included in an object. This object may include one or more methods that receive requests for information included in data source entries 720. For example, an application or a component of an application server may need to retrieve data from a database residing on a backend system remote from the application server on which the application is running. The application server may be coupled to the backend system by a network. In order to access the required data, the application may need to establish a network connection with the database. In some cases, the application may only include an abstract designation or name for the desired database. The application may generate a request for information necessary to connect to the database. A function included in the object may use the abstract designation supplied by the application to identify and return property information from a corresponding data source entry 720.

Data source entry 720A may include a number of properties used to configure a data source, such as DB Name field 721A. DB Name field 721A may store a name for the database as provided by a naming directory interface service. URL field 723A may include the URL of the database. A URL is the address of a resource available on the Internet. The URL includes the protocol of the resource (e.g. http://or ftp://), along with the domain name (IP address) and the hierarchical name for the resource. User Name field 725A may include a name that the database recognizes as being authorized to access and or modify data. Class Name field 727A may include specific information about the database driver associated with the database. Password field 729A may include information that the database may use to authenticate the user specified by User Name field 725A. Abstract Name field 739A may include a string of character data that serves as an alias for the database. The abstract name may allow an application programmer to easily associate the type of data stored in the database but may contain little or no information needed to instantiate a network connection with the database. Many other types and/or combinations of types of properties and/or information may be included in a data source entry 710.

Identity 710 may include a subset of the information fields of data source entry 720. Typically, data source configuration information 700 may include multiple data source entries 720 corresponding to a particular data resource. For example, different components of an application may access a data resource for different reasons and may refer to that data resource by different abstract designations 739. Data source configuration information 700 may include a data source entry 720 corresponding to each abstract designation included in an application. A data source ID manager may be configured to identify a subset of the information included in a data source entry 720 as the data source identity 720 for that data source entry. In some embodiments, a configuration utility may be provided by the application server to configure the data source properties. The configuration utility may also be used to specify the particular set of properties that should be used to identify a particular data source. Different sets of properties may be specified for different types of data source, e.g. from different vendors or for different types of backend data resource.

The data source entries 720 corresponding to a particular data resource may all include the same identity 710. In the illustrated embodiment, identity 710 may include the DB Name field 721, the URL field 723, and the User Name field 725. In other embodiments, the identity may include a greater or lesser number of information fields and/or other combinations of information fields included in the data source entry. The identity may incorporate less than all of the information included in an information field of the data source entry. The data source manager may combine and/or reorder entire information fields or portions of information fields included in the data source entry, in order to produce the data source identity 720. Regardless of format, the information included in the identity is sufficient to identify all data sources for a single data resource uniquely with respect to data sources for other data resources in a networked computer system.

An application server may use proxies in conjunction with data source identities in order to eliminate the instantiation of redundant data sources. When the application server is prepared to instantiate a data source associated with an abstract name, the data source ID manager may determine the identity of the data source. The data source ID manager may compare the identity of the data source to be instantiated with the identities of existing data sources. If no existing data source has a matching identity, the application server may proceed with the instantiation of the new data source. However, if a data source with a matching identity does exist, the application server may instantiate a proxy for the new data source in the naming directory space instead. The proxy for the new data source may receive connection requests intended for the new data source and route them to the existing data source with the matching identity. In this way the allocation of system resources to a redundant data source may be avoided.

Figure 8:
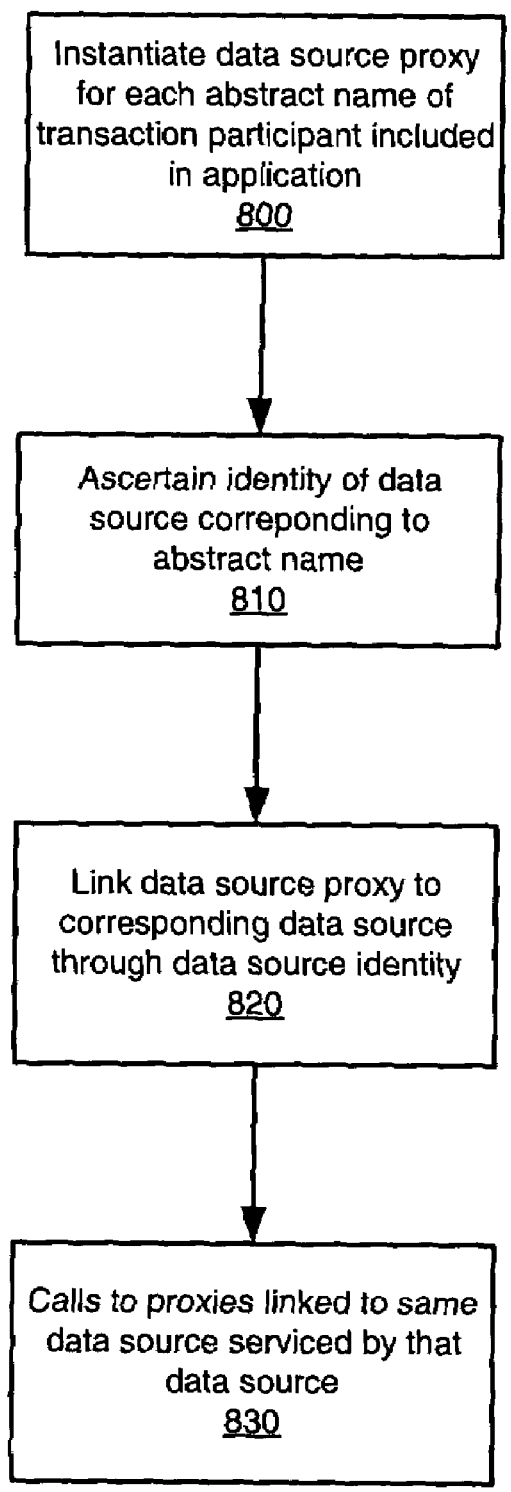
FIG. 8 is a flow chart of a method of configuring an application server, according to one embodiment.

FIG. 8 is a flow chart of a method of configuring an application server, according to one embodiment. At 800, a data source proxy may be instantiated corresponding to each data resource reference (e.g. abstract name) used in an application. Data source identities may be determined for each abstract data source reference in the application, as shown in block 810.

Each data source proxy may be linked to a data source with a matching identity, as illustrated at 820. For example, multiple abstract names for data resources included in an application may refer to the same data resource e.g. a particular database on a backend system. A single data source may be included in the application server to provide connections to that database. All data source proxies whose associated abstract names correspond to the identity of the data source may be linked to that data source. The application may then obtain a connection to the data resource using any abstract name linked to the data source, as illustrated at block 830.

In addition to conserving resources in the application server by eliminating redundant data sources, the association of identities with data sources may also improve the efficiency of transactions in multi-tier applications, as described below.

Some application programs, particularly business applications, may require that the results of sets of data modifying operations must be committed to permanent storage atomically, that is either together or not at all, in order for the data to remain consistent and to maintain data integrity. Such a set of operations may be referred to as a transaction. An application may designate operations to be included in a transaction by including a statement to initiate a transaction, designating an identity for the transaction, and concluding the operations included in the transactions with a command to commit the database operations to permanent storage.

An example of an application in which a transaction may be beneficial is a banking application in which funds are transferred from one account to another. The application may accomplish the transfer by performing a withdrawal from one account and a deposit to another account. If the withdrawal operation completes but the deposit operation does not, the first account may reflect and improper balance. Conversely, if the deposit operation completes, but the withdrawal fails, the second account may show an improper balance. In the case of such a set of interdependent operations, neither the withdrawal nor the deposit should complete unless both can complete. By including both the withdrawal and deposit operations in a transaction, the application may designate that the operations are required to complete atomically.

In some cases, a transaction may be limited in scope to operations, which modify data in only one database on a single backend system. Such operations may be referred to as local transactions and the database or backend resource manager may itself, manage such transactions using a single-phase commit protocol. In other instances, a transaction may span multiple databases, backend systems, and/or resource managers. These transactions may be referred to as distributed or global transactions. Global transactions may require transaction coordination by a transaction manager external to the backend systems involved in the transaction. The transaction manager may coordinate a global transaction using a two-phase commit protocol.

Figure 9:
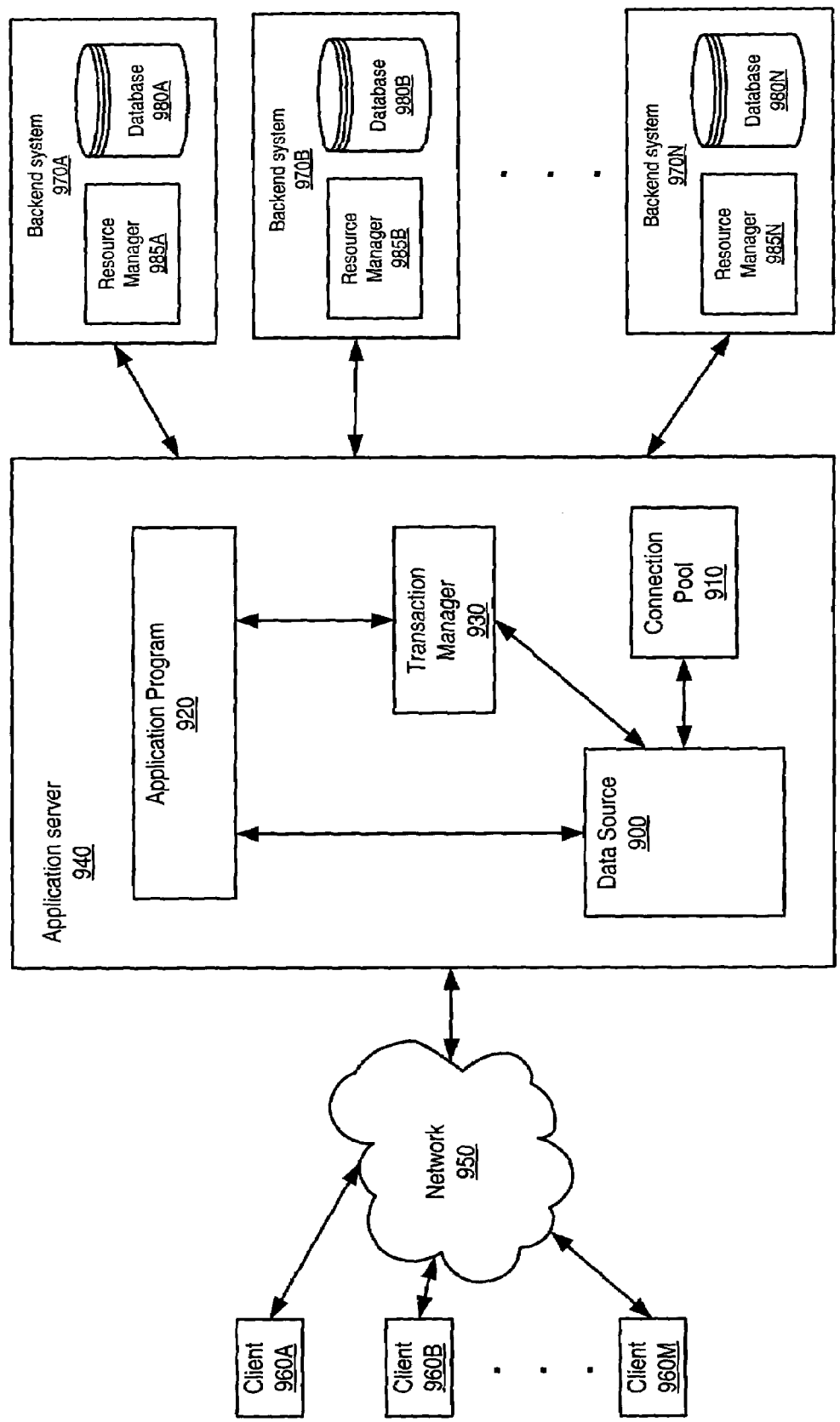
FIG. 9 illustrates components of a networked, transactional computer system, according to one embodiment.

FIG. 9 illustrates a networked computer system, according to one embodiment. The networked computer system may support the execution of three-tier applications. A three-tier application is an application that may be organized into three major parts, each of which may be distributed within a networked computer system. The three parts (tiers) may include: one or more clients 960, one or more servers 940, and one or more back-end systems 970 (e.g. databases) along with their management functions 985. In the first tier, a client may be a program running on a user's computer that includes a graphical user interface, application-specific entry forms, and/or interactive windows for interacting with an application. An exemplary client may be a web browser that allows a user to access the Internet. In the second tier, a server may be a program such as an application server that contains the business logic for an application such as banking transactions or purchasing merchandise for the user of a client. The server may be running on one or more computers.

A plurality of client systems may connect to one or more servers as components of a network 950. An exemplary network of this type is the Internet. Clients may submit requests to servers. In some instances a server 940 may be able to fulfill a request using only resources available within the server itself. In other cases, the server may need to access resources in other networked computer systems in order to fulfill the client's request. For example, server 940 may request data on the behalf of client 960 from a database 980 residing on a backend system 970. This request may require the establishment of a connection between the server 940 and a backend system 970. A connection is a set of computer system resources and parameters, which allows communications between two or more entities within the system.

The third tier of a three-tier application may include one or more backend systems 970. A backend system 970 may include one or more databases 980 and programs that facilitate access to the data they contain, designated resource managers 985. Databases on backend systems may be referred to as data sources. In order to perform a particular function, an application 920 may need to retrieve and/or alter data in multiple databases resident on multiple backend systems. A set of two or more related operations that must be coordinated together atomically may be referred to as a transaction. A transaction involving more than one data source may be referred to as a distributed or global transaction.

Figure 10:
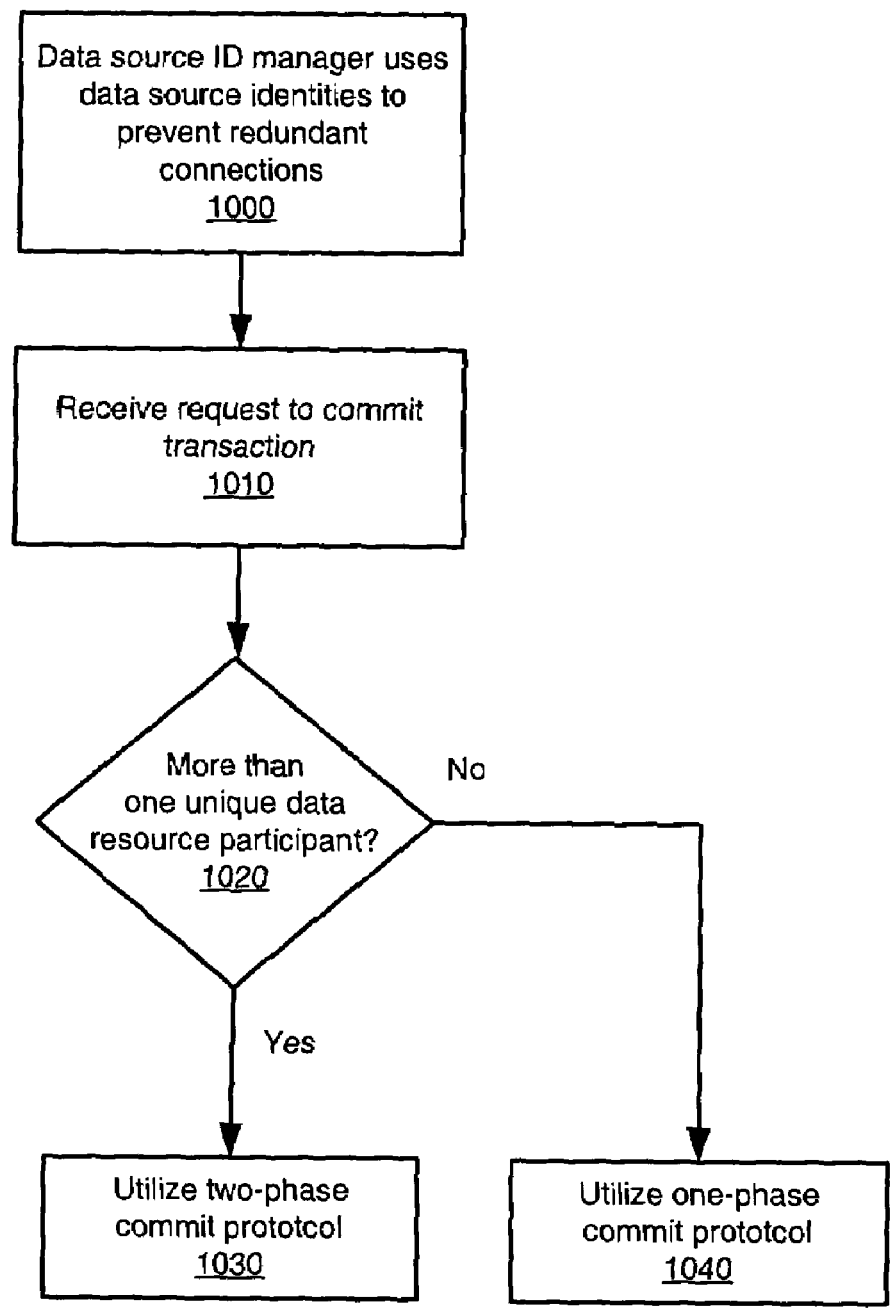
FIG. 10 is a flow chart of a method for operating a transaction manager, according to one embodiment.

FIG. 10 is a flow chart illustrating a method for transaction management, according to one embodiment. As illustrated by block 1000, after a transaction has been initiated, the data source ID manager may determine identities of data sources supplying connections to transaction participants to ensure that redundant connections are avoided for communicating with any data resource participating in the transaction. At some point, the application may request that the transaction manager commit the state of the transaction, as indicated at block 1010. As shown by decision block 1020, the transaction manager may determine whether more than one unique data resource is participating in the transaction by checking the number of unique connections being used. If multiple unique data resources have been enlisted, the transaction manager may use a two-phase commit protocol to coordinate the transaction as indicated in block 1030, whereas a one-phase commit optimization may be used for a transaction communicating with a single data resource, as shown at 1040. For example, in the case where an application communicates with a single data resource using a plurality of abstract names, the data source ID manager may ensure that only a single connection is enlisted in the transaction. Thus, the transaction manager may coordinate the transaction as a local transaction rather than a global transaction. This may reduce the amount of resources and time needed to execute the transaction.

Figure 11:
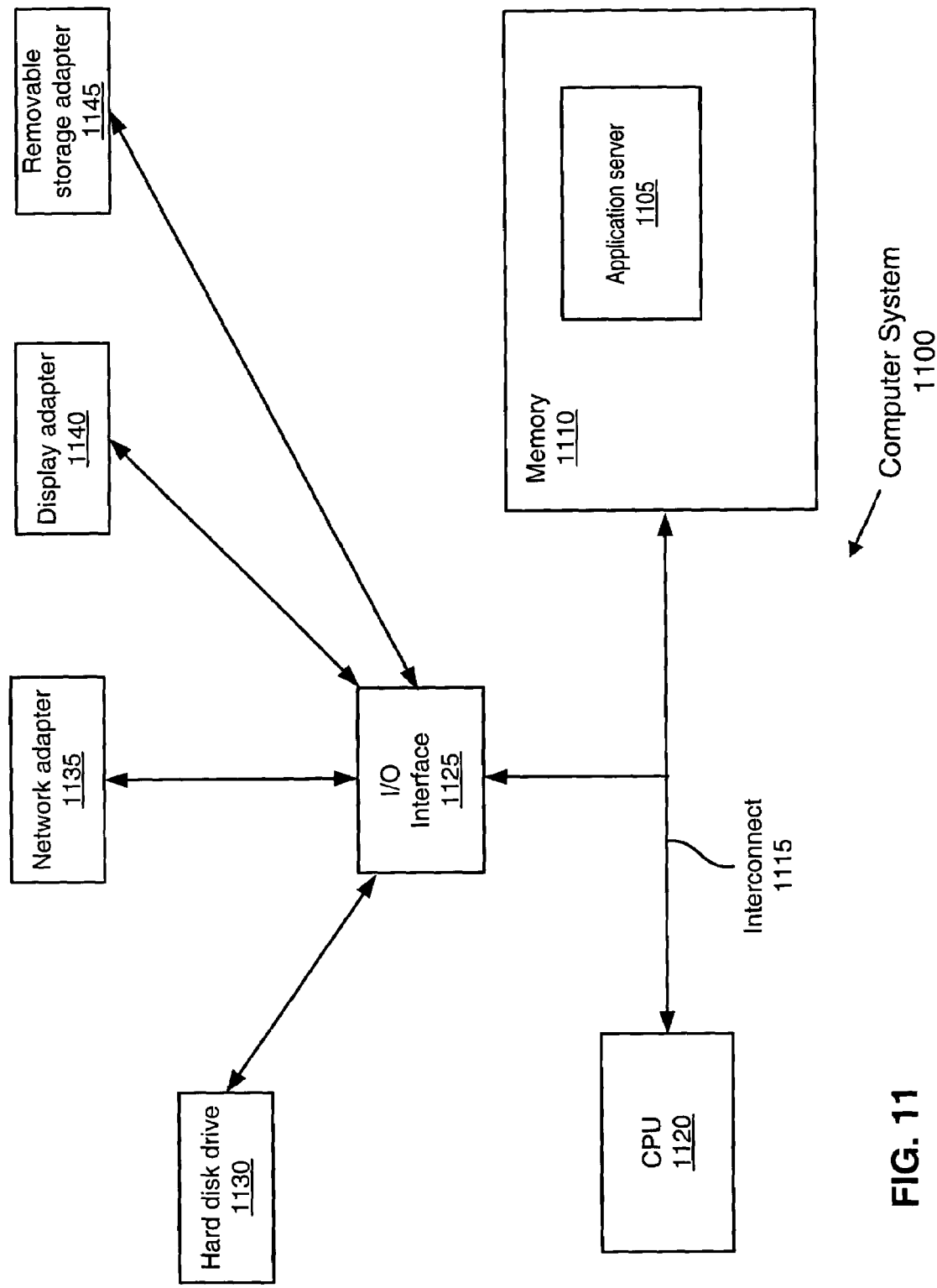
FIG. 11 illustrates an exemplary computer system, according to one embodiment.

FIG. 11 illustrates one embodiment of a computer system 1100 that may include an application server 1105 providing a data source configuration tool as described herein. Computer system 1100 may include many different components such as memory 1110, a central processing unit (CPU) or processor 1120, and an input/output (I/O) interface 1125. Interconnect 1115 is relied upon to communicate data from one component to another. For example, interconnect 1115 may be a point-to-point interconnect, a shared bus, a combination of point-to-point interconnects and one or more buses, and/or a bus hierarchy including a system bus, CPU bus, memory bus and 110 buses such as a peripheral component interconnect (PCI) bus.

The computer system 1100 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1130, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1100 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (WFC), or other technologies or methodologies, as desired.

Memory 1110 may store program instructions accessed by the CPU 1120. For example, instructions and data implementing an application server 1005 may be stored in memory 1110. Application server 1105 may include one or more applications, data sources, data source proxies, transaction managers, and/or a data source ID manager.

Computer system 1100 may further include other software and hardware components, such as an input/output (I/O) interface 1125, that may be coupled to various other components and memory 1110. The CPU 1120 may acquire instructions and/or data through the I/O interface 1025. Through the I/O interface 1125, the CPU 1120 may also be coupled to one or more 110 components. As illustrated, I/O components may include a hard disk drive 1130, a network adapter 1135, a display adapter 1140 and/or a removable storage adapter 1145. Some components 1130 to 1145 may be coupled to the I/O interface 1125. In addition, the computer system 1100 may include one or more of a particular type of component. The computer system 1100 may include one or more components coupled to the system through a component other than the I/O interface 1125. Some computer systems may include additional and/or other components such as application software (e.g., stored in memory 1110), other CPUs, video monitors or other displays, track balls, mice, keyboards, printers, plotters, scanners, or other types of I/O devices for use with computer system 1100.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

We claim:

1. A system, comprising:

an application server; and one or more backend systems coupled to the application server;

wherein the one or more backend systems comprise a plurality of data resources of different types; and wherein the application server comprises a data source configuration utility configured to:

determine data source configuration parameters associated with each of the plurality of data resources;

present said parameters to a user through a common user interface;

receive values for said parameters from the user; and configure properties in a plurality of data source configuration objects based on the received values in order to configure data sources for the plurality of data resources, wherein a particular data source of the data sources is configured to provide, to an application deployed at the application server, one or more connections to communicate with one or more of the plurality of data resources, wherein the one or more connections are generated using one or more parameter values received from the user.

2. The system as recited in claim 1, wherein the utility is configured to request the user to enter a subset of the data source configuration parameters associated with each of the plurality of data resources to be used as an identity for each of the data sources.

3. The system of claim 2, wherein the utility is configured to suggest to the user a subset of database configuration parameters to be used as the identity for the data source.

4. The system of claim 2, wherein the utility is configured to verify the uniqueness of the identity among the plurality of data resources.

5. The system of claim 4, wherein to verify the uniqueness of the identity among the plurality of data resources the utility is configured to compare the identity to identities of all the other data resources included in the plurality of data resources.

6. The system of claim 4, wherein in response to identifying another data resource with a matching identity, the utility is configured to request the user to enter a different subset of data source configuration parameters to be used as the identity for the data source.

7. The system as recited in claim 1, wherein at least one of the plurality of data resources is the product of a particular vendor, and wherein at least one other of the plurality of data resources is the product of another vendor different from the particular vendor.

8. The system of claim 1, wherein the utility is configured to verify values of data source configuration parameters by instantiating a data source and communicating with the corresponding data resource using a connection obtained from the data source.

9. The system of claim 8, wherein to verify values of data source configuration parameters does not require the deployment of an application.

10. The system of claim 8, wherein in response to a failure to verify the data source configuration, the utility is configured to reconfigure the data source.

11. A method, comprising:
   determining data source configuration parameters associated with each of a plurality of different types of data resources;
   presenting said parameters to a user;
   receiving values for said parameters from the user; and
   configuring properties in a plurality of data source configuration objects stored within an application server based on the received values in order to configure data sources for the plurality of different types of data resources, wherein a particular data source of the data sources provides to an application deployed at the application server one or more connections to communicate with a data resource that corresponds to one of the plurality of types of data resource, and wherein the one or more connections are generated using one or more parameter values received for the data source from the user.

12. The method as recited in claim 11, further comprising requesting the user to enter a subset of data source configuration parameters associated with each of the plurality of data resources to be used as an identity for each of the data sources.

13. The method as recited in claim 12, further comprising suggesting to the user a subset of database configuration parameters to be used as the identity for the data source.

14. The method as recited in claim 13, further comprising verifying the uniqueness of the identity among the plurality of data resources.

15. The method as recited in claim 14, wherein said verifying comprises comparing the identity to identities of all the other data resources included in the plurality of data resources.

16. The method as recited in claim 15, further comprising requesting the user to enter a different subset of data source configuration parameters to be used as the identity for the data source in response to identifying another data resource with a matching identity.

17. The method as recited in claim 11, wherein at least one of the plurality of data resources is the product of a particular vendor, and wherein at least one other of the plurality of data resources is the product of another vendor different from the particular vendor.

18. The method as recited in claim 11, further comprising verifying values of data source configuration parameters by instantiating a data source and communicating with the corresponding data resource using a connection obtained from the data source.

19. The method as recited in claim 18, wherein said verifying is performed without the deployment of an application.

20. The method as recited in claim 18, further comprising reconfiguring the data source in response to a failure to verify the data source configuration.

21. A computer-accessible storage medium comprising program instructions, wherein the program instructions are computer-executable to:
   determine data source configuration parameters associated with each of a plurality of data resources;
   present said parameters to a user through a common user interface;
   receive values for said parameters from the user; and
   configure properties in a plurality of data source configuration objects based on the received values in order to configure data sources for the plurality of data resources, wherein a particular data source of the data sources is configured to provide, to an application deployed at an application server, one or more connections to communicate with one or more of the plurality of data resources, wherein the one or more connections are generated using one or more parameter values received from the user.

22. The computer-accessible storage medium as recited in claim 21, wherein the program instructions are further computer-executable to request the user to enter a subset of the data source configuration parameters associated with each of the plurality of data resources to be used as an identity for each of the data sources.

23. The computer-accessible storage medium as recited in claim 22, wherein the program instructions are further computer-executable to suggest to the user a subset of database configuration parameters to be used as the identity for the data source.

24. The computer-accessible storage medium as recited in claim 22, wherein the program instructions are further computer-executable to verify the uniqueness of the identity among the plurality of data resources.

25. The computer-accessible storage medium as recited in claim 24, wherein to verify the uniqueness of the identity among the plurality of data resources the utility is configured to compare the identity to identities of all the other data resources included in the plurality of data resources.

26. The system as recited in claim 1, wherein the particular data source is configured to provide a global connection to the application for a transaction accessing two or more of the plurality of data resources, and to provide a local connection to another application deployed at the application server for another transaction accessing a single one of the plurality of data resources.

27. The system as recited in claim 1, wherein to present said parameters to the user, the data source configuration utility is further configured to convert data expressed in a platform independent programming language into other data expressed in a markup language.

28. The system as recited in claim 1, wherein the particular data source comprises a software bean component, and wherein, to configure a property in a data source configuration object corresponding to the particular data source, the data source configuration utility is further configured to convert data expressed in a markup language into other data expressed in a platform independent programming language.

29. The system as recited in claim 1, wherein the application server further comprises a data source identification (ID) manager configured to:

intercept a request from the application for a connection of a particular connection type to a particular one of the plurality of data resources;

identify a data source ID corresponding to the request;

determine whether a connection of the particular connection type was previously supplied by a data source identified by the data source ID and is available for the application; and if a connection of the particular connection type was previously supplied and is available for the application, provide the connection to the application; and if a connection of the particular connection type is not available, initiate a generation of a new connection corresponding to the request.

30. The system as recited in claim 1, wherein a value received from the user for a particular parameter comprises a class name corresponding to a database driver module to be used to communicate with a particular one of the plurality of data resources.

* * * * *